Figure 1:
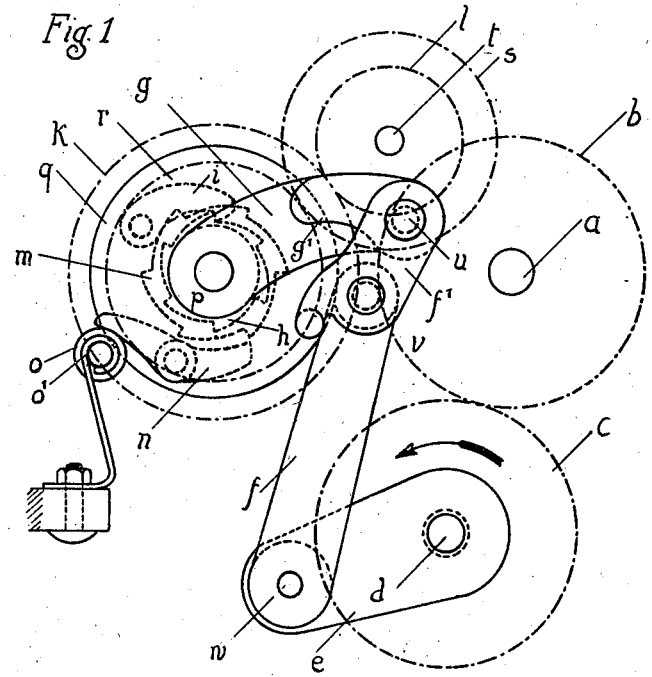

Feb. 13, 1923.

P. A. HELMBOLD.
DRIVING MECHANISM FOR COMBING MACHINES.
FILED SEPT. 14, 1920.

1,444,877.

Inventor:
Paul A. Helmbold
Hy. Imrie
attorney

Patented Feb. 13, 1923.

1,444,877

UNITED STATES PATENT OFFICE.

PAUL AUGUSTE HELMBOLD, OF VOHWINKEL, GERMANY.

DRIVING MECHANISM FOR COMBING MACHINES.

Application filed September 14, 1920. Serial No. 410,136.

*To all whom it may concern:*

Be it known that I, PAUL AUGUSTE HELMBOLD, a citizen of the French Republic, residing at Vohwinkel, Rhineland, Germany, have invented a new and useful Improvement in Driving Mechanism for Combing Machines, of which the following is a specification.

The subject matter of the present invention is a driving gear for the drawing-off roller of combing machines of the Heilmann type, and the novelty of the said gear consists in that, by means of toothed wheels of different sizes mounted on a shaft which is rotated by ratchet wheels or cog-discs mounted on the same shaft and cooperating pawls, the drawing-off roller is driven in such a manner that it has imparted to it alternately a forward movement and a slower backward movement. The rotation of the shaft is suitably effected by means of actuating mechanism which in its simplest form consists of an arm mounted on the shaft and an elbow rod which couples the said arm to the driving crank. Between these there may be a pause during which the drawing-off roller stands still.

An embodiment of the invention is illustrated in the accompanying drawing, in which:—

Fig. 1 is a side elevation, and

Figure 2:
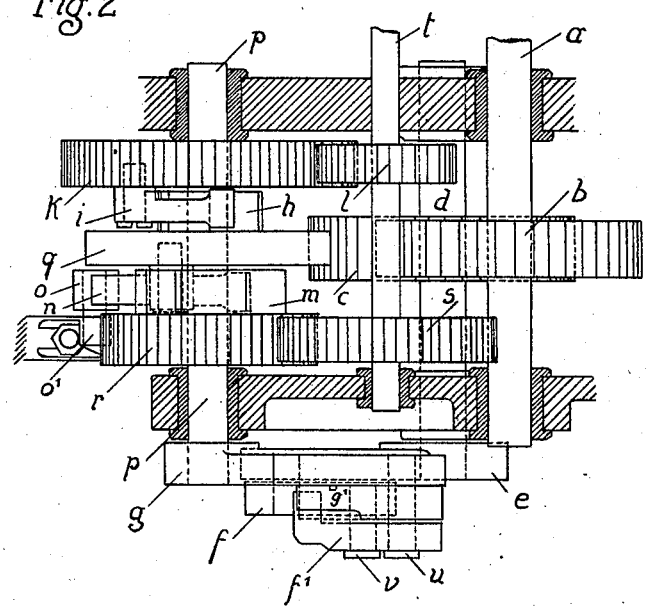

Fig. 2 a plan view of the gear.

In this drawing $d$ is a shaft which carries a driving crank $e$ and is rotated by means of gear wheels $b$ and $c$ from the shaft $a$ of the circular comb. The crank $e$ is connected to a rod $f$ by a pin $w$, and the said rod is coupled by a pin $u$ to a connecting rod $g$ fixed on a shaft $p$. A small ratchet wheel $h$ is fixed on this shaft, and a pawl $i$ which is pivoted on a toothed wheel $k$ is engaged therewith. This wheel $k$ rotates free on the shaft $p$ and gears with a toothed wheel $l$ which is fixed on the shaft $t$ of the drawing-off roller and is half the size of the wheel $k$. Rotation of the shaft $p$ to the right by the mechanism $d, f, g$ thus effects through the intermediary of the pawl $i$ and the wheel $k$ the corresponding quick forward rotation of the drawing-off roller shaft $t$.

The shorter movement in the opposite direction is brought about by the following means. On the shaft $p$ another ratchet wheel $m$ is mounted to rotate free thereon; the said wheel forms part of a toothed wheel $r$, and a pawl $n$ in the form of a two-armed lever engages with it, which lever is pivoted on a disc $q$ that is fixed on the shaft $p$. The wheel $r$ gears with a wheel $s$ of the same size mounted on the shaft $t$ of the drawing-off roller, and during the rotation of the shaft $p$ to the left the pawl engages the ratchet wheel $m$ and drives the wheels $r, s$ so that the shaft $t$ is rotated backwards in the opposite direction to that in which it is driven by the pawl $i$ and ratchet wheel $h$ and at half the speed. This rotation backwards takes place approximately during the first three-fifths of the rotation of the crank $e$, and the forward rotation of the shaft $t$ twice as quickly during the last two-fifths. In order to permit of this reverse rotation, the pawl $n$ is put out of action at the commencement thereof by its outer arm coming in contact with a roller $o$ carried by a spring bracket $o'$. The motion of the drawing-off roller is such that its forward movement takes place while the crank is traversing approximately two-fifths of the crank circle; and the remaining portion is so utilized that it is again approximately halved and for a little more than one fourth of the whole circle the drawing-off roller stands still, while the other fourth corresponds to the backward movement. For that purpose the connecting rod $f$ is not made straight and in one piece but consists of two parts $f$ and $f'$ which are pivoted to each other by a pin $v$ and pivotally connected at $u$ with a thickened portion $g'$ of the oscillating arm $g$. The result of this is that for the forward movement of the drawing-off roller and when the crank $e$ is rotating in the direction of the arrow the almost straight-stretched rod $f, f'$ exerts a pulling action. When the crank reaches the dead centre, the two parts $f, f'$ of the connecting rod pivot on the pin $v$ under the pushing action of the crank $e$, with the result that there is lost motion and the drawing-off roller stands still until the part $x$ of the rod $f, f'$ strikes against the thickened portion of the arm $g$. Thereupon the rod $f$ acts upon the swinging arm $g$ with a leverage shortened by the distance from $u$ to $v$, and thereby the actuating mechanism is brought back to its starting position notwithstanding the shorter path of the crank and during this movement the rearward movement of the drawing-off roller is obtained. The unequal oscillation of the shaft $p$ may if desired be effected in other ways.

What I claim is:—

1. Driving mechanism for actuating the drawing-off roller of a combing machine, comprising in combination a shaft rotatably mounted parallel to the axis of the drawing-off roller, a gear wheel mounted loose on the said shaft and in gear with a wheel of less diameter which is connected rigidly with the drawing-off roller, another gear wheel mounted loose on the said shaft and in gear with a wheel of equal diameter which is connected rigidly to the drawing-off roller, a pair of ratchet wheels of different diameters fixed on the said shaft, a pawl mounted on the loose gear wheel first referred to and engaged with the smaller ratchet wheel, an oppositely-acting pawl mounted on a disc fixed on the said shaft and adapted to engage the other ratchet wheel, means actuated from the continuously rotating comb cylinder for oscillating the said shaft, and means for putting out of action the second pawl referred to when the other pawl is in action.

2. Driving mechanism for actuating the drawing-off rollers of combing machines, comprising in combination a constantly rotating crank geared to the comb shaft, a connecting rod pivotally mounted on the crank pin and consisting of two pivotally connected parts out of alignment with each other, a shaft rotatably mounted parallel to the axis of rotation of the said crank, an arm fixed on the said shaft and pivotally connected at its free end to the said connecting rod, a pair of gear wheels of different sizes mounted loose on the said shaft and in gear with corresponding gear wheels fixed on the drawing-off roller shaft, a loose ratchet wheel and a fixed ratchet wheel mounted on the shaft which carries the said pair of loose gear wheels, a pawl pivoted on one of the said loose gear wheels and acting upon the fixed ratchet wheel, and a second pawl pivoted on a disc fixed on the said shaft and acting upon the loose ratchet wheel.

PAUL AUGUSTE HELMBOLD.

Witnesses:
DAMON C. WOODS,
PAUL S. LONGARCKELL.